United States Patent [19]

Kozak, III

[11] Patent Number: 4,672,998
[45] Date of Patent: Jun. 16, 1987

[54] HYDRAULIC SWIVEL CONNECTOR

[75] Inventor: Michael A. Kozak, III, Encinitas, Calif.

[73] Assignee: San Diego Gas & Electric, San Diego, Calif.

[21] Appl. No.: 721,193

[22] Filed: Apr. 9, 1985

[51] Int. Cl.$^4$ .............................................. F16L 37/28
[52] U.S. Cl. .............................. 137/614.04; 137/614; 285/190; 285/354
[58] Field of Search ................ 285/190, 354; 137/614, 137/614.04

[56] References Cited

U.S. PATENT DOCUMENTS

| | | | |
|---|---|---|---|
| 2,648,553 | 8/1953 | Ulrich | 137/614.04 |
| 2,730,380 | 1/1956 | Espy et al. | 137/614.04 |
| 2,800,343 | 7/1957 | Ulrich | 137/614.04 |
| 2,829,673 | 4/1958 | Reese | 285/354 |
| 3,098,662 | 7/1963 | Iversen | 285/190 |
| 3,267,963 | 8/1966 | Hupp | 137/614.04 |
| 3,402,253 | 9/1968 | McCracken | 285/190 |

FOREIGN PATENT DOCUMENTS

| | | | |
|---|---|---|---|
| 1041914 | 10/1953 | France | 285/190 |
| 931243 | 7/1963 | United Kingdom | 285/190 |

OTHER PUBLICATIONS

Enerpac "Repair Parts Sheet," 9/79.
Aeroquip, "Swivel Joints", 180, 192, 193.
Burndy, "Hydraulic Hypress", 1967, 1, 4, 5, 8.

Primary Examiner—A. Michael Chambers
Attorney, Agent, or Firm—Spensley, Horn, Jubas & Lubitz

[57] ABSTRACT

A hydraulic swivel connector which includes a block and a stem with a female quick disconnect coupler extending from the stem. Such an arrangement has a very compact design which allows the connector to be used to provide a swivel connection between a hydraulic hose and a tool head for constricted working environments.

4 Claims, 5 Drawing Figures

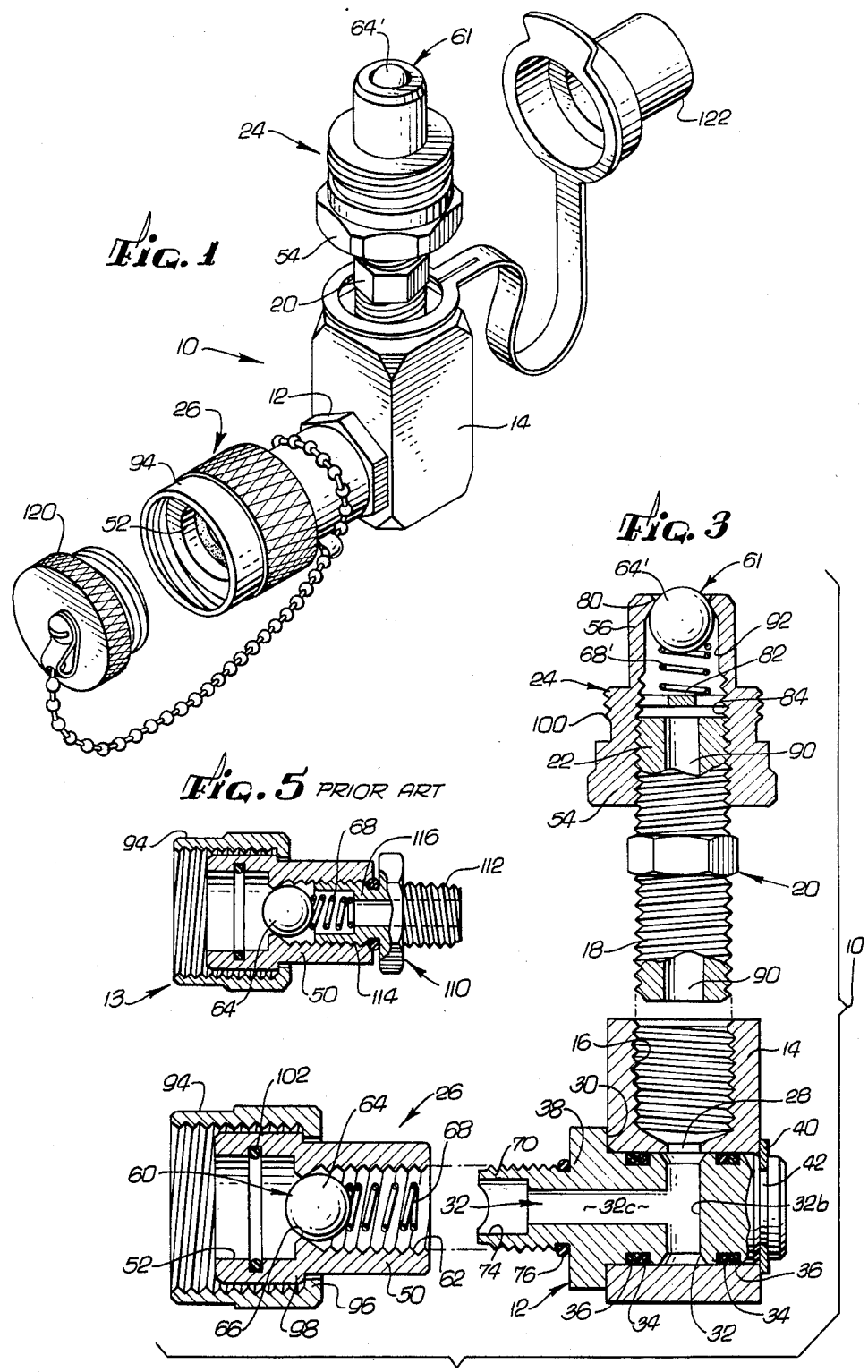

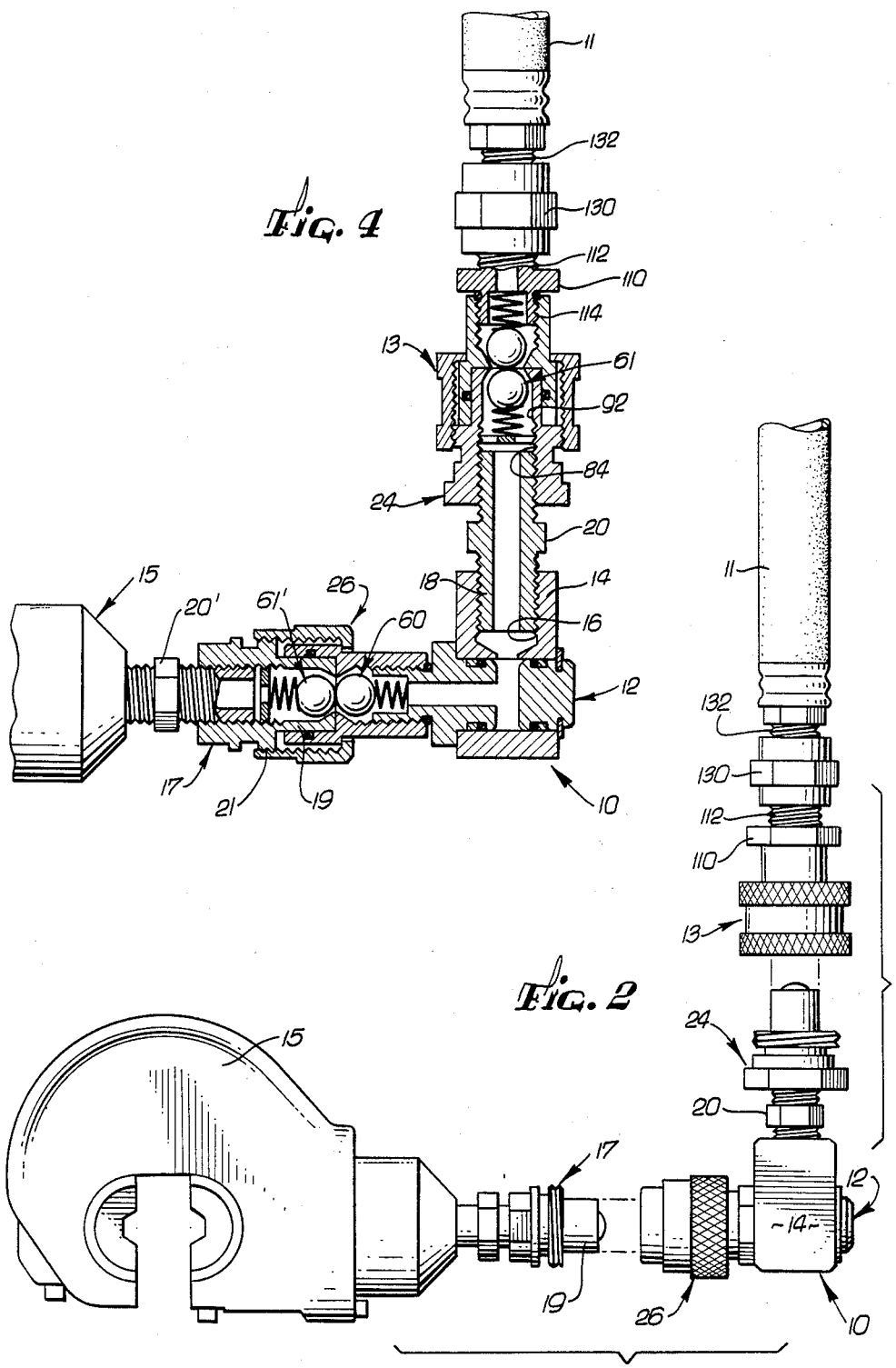

HYDRAULIC SWIVEL CONNECTOR

BACKGROUND OF THE INVENTION

1. Field of the Invention

The present invention relates to hydraulic connectors, and more particularly to such connectors for hydraulic tools.

2. Discussion

A number of portable tools are operated by hydraulic pressure. Examples of portable hydraulic tools include "compression heads" and "cutting heads". These tool heads are attached to flexible hydraulic hoses and hydraulic fluid is pumped under very high pressure (as high as 10,000 p.s.i.) through the hose to the tool head.

It is often necessary to operate the tool heads in very constricted environments. Under such conditions, the tool is typically first positioned and the hose is bent as necessary to avoid obstructions before the hose is pressurized. However, if the hose is inadvertently overflexed, kinks can occur which weaken the hose. As a result, upon pressurization of the hose, such kinked hoses have been known to rupture, often causing injury to the workers as well as damage to the equipment itself.

Hydraulic pumps such as the Enerpac PA-133 or PA-135 have swivel connectors for coupling hydraulic hoses to the pump. Such swivel connectors provide 360° of freedom of movement for the hose and generally include a stem threaded into the pump and a block which pivots about the stem. The hydraulic hose from the tool head is coupled to the connector block. Because the connector stem is typically specifically designed for attachment to the pump, many pump swivel connectors are not readily adapted to other applications. Other types of hydraulic swivel connectors are known but these connectors are typically coupled to other hydraulic equipment through pipe fittings which are often bulky or inconvenient to use.

SUMMARY OF THE INVENTION

It is an object of the present invention to provide an improved hydraulic swivel connector which allows hydraulic hoses and hydraulic tool heads to be quickly and easily connected and disconnected from the connector. It is a further object to provide an improved swivel connector which is sufficiently compact to allow tool heads to be used more safely in tight working areas.

In accordance with a preferred embodiment of the present invention, this is achieved by a hydraulic swivel connector having a female quick disconnect coupler which extends directly from the stem of the hydraulic swivel connector. In the illustrated embodiment, the female quick disconnect coupler has a ball valve which includes a valve seat, a ball and a spring seated against the connector stem for urging the ball to seat against the valve seat. Because the ball and spring are supported at one end by the connector stem itself, a very compact design is achieved which enables a tool head/swivel connector assembly to be readily inserted into a number of very constricted spaces.

These and other objects and advantages will become more clear in connection with the following drawings and detailed description.

BRIEF DESCRIPTION OF THE DRAWINGS

FIG. 1 is a perspective view of a hydraulic swivel connector in accordance with a preferred embodiment of the present invention.

FIG. 2 is a side view of the connector of FIG. 1 shown with a tool head and a hydraulic hose;

FIG. 3 is a cross-sectional view of the swivel connector of FIG. 1;

FIG. 4 is a cross-sectional view of the connector, tool head and hydraulic hose of FIG. 2 shown assembled; and FIG. 5 is a cross-sectional view of a female quick disconnect coupler of the prior art.

DETAILED DESCRIPTION OF THE DRAWINGS

Referring to FIGS. 1-4, a hydraulic swivel connector in accordance with a preferred embodiment of the present invention, is indicated generally at 10. The connector 10 includes a cylindrical stem 12 (FIGS. 2-4) and a generally rectangular block 14 which pivots about the stem 12. The block 14 has a threaded cylindrical bore 16 which receives one threaded end 18 of a hex nipple 20. Attached to the other threaded end 22 of the nipple 20 is, a male quick disconnect coupler 24. An example of a suitable male quick disconnect coupler is the male half of an Enerpac ⅜ inch high flow coupler, part number C-604. The male coupler 24 allows the block 14 of the connector 10 to be quickly coupled to other hydraulic equipment such as the hydraulic hose 11, which has a corresponding female coupler 13.

In accordance with the present invention, the connector 10 also has a female quick disconnect coupler 26 which extends directly from the stem 12. The female coupler 26 allows the connector stem 12 to be readily coupled to hydraulic equipment such as the compression head 15 which has a male quick disconnect coupler 17 similar to the male coupler 24 of the connector 10. The compression head 15 is shown for purposes of illustration only and it is recognized that the connector 10 may be utilized with a variety of other tool heads and hydaulic equipment.

Previously, the male coupler 17 of the tool head 15 has typically been coupled directly to the female coupler 13 of the hydraulic hose 11 with the other end of the hose 11 being coupled to a hydraulic fluid pump. However, because of obstructions in the working area, it has often been necessary to bend the hose adjacent the tool head to avoid the obstructions. As previously mentioned, overflexing the hose can cause the hose to rupture.

Use of the swivel connector 10 between the tool head and the hydraulic hose can eliminate the need for sharply bending the hose adjacent the tool head. For example, in the illustrated embodiment, the female coupler 26 of the connector 10 can be coupled directly to the male coupler 17 of the hydraulic tool head 15, and the male coupler 24 of the connector 10 can be coupled to the corresponding female coupler 13 of the hydraulic hose 11 as shown in FIG. 4. Accordingly, the tool head 15 can be positioned adjacent the work piece with the block 14 of the connector 10 being pivoted as necessary to position the hose to avoid obstructions without overflexing the hose. Moreover, the compact design of the connector 10 allows the connector to be used in very constricted work areas.

Referring primarily to FIG. 3, the block 14 has a passageway 28 coupling the threaded bore 16 to a cylindrical cavity 30 in which the stem 12 rotates. The stem 12 has a passageway 32 which includes an annular groove 32a about the stem 12 and aligned with the passageway 28 of the block 14. Communicating with the groove 32a is a transverse passageway portion 32b which in turn communicates with a longitudinal portion 32c of the passageway 32. It is seen that regardless of the rotational position of the block 14, a complete flow channel comprising the stem passageway 32 and block passageway 28 and bore 16 is provided for hydraulic fluid passing through the swivel connector 10. A pair of O-rings 34 and backup O-rings 36 are seated in annular grooves on either side of the stem central groove 32a to seal against hydraulic fluid leaks. The stem 12 is secured in the cavity 30 of the block 14 by a hex shoulder 38 engaging the block 14 on one side and a retaining ring 40 seated in a groove 42 of the stem 12, which engages the other side of the block 14.

The female quick disconnect coupler 26 includes a generally cylindrical female coupler member 50 which has a cylindrical bore 52 at one end for receiving the cylindrical head portion 19 of the male quick disconnect coupler 17.

The female coupler 26 has a ball valve 60 between the bore 52 and a threaded bore 62. The ball valve 60 includes a ball 64 which is urged against an annular valve seat 66 of the female coupler member 50, by a coil spring 68. The female coupler member 50 is screwed onto the end 70 of the stem 12, which has threads to receive the threads of the female coupler member bore 62. The stem passageway 32 has an enlarged cylindrical bore 74 to receive one end of the spring 68. In the illustrated embodiment, the threads of the stem end 70 and coupler member bore 62 are machine threads and an O-ring 76 seated in a groove adjacent the shoulder 38 is provided to seal the attachment of the coupler member 50 to the stem 12.

As shown in FIG. 3, a typical male quick disconnect coupler such as that indicated at 24 also has a ball valve which is indicated at 61. The ball valve 61 includes a ball 64' seated against an annular valve seat 80 at the end of the head portion 56, by a coil spring 68'. The other end of the spring 68' abuts a platform 82 of the male coupler number 54. The male coupler member 54 has a cylindrical threaded bore 84 which receives the threaded end 22 of the hex nipple 20. The other end 18 of the hex nipple 20 is also threaded to allow the hex nipple 20 to be screwed into the threaded bore 16 of the connector block 14. In the illustrated embodiment, the threads of the male coupler bore 84, the hex nipple 20 and the block bore 16 are pipe threads such that O-rings for sealing are not necessary. The male quick disconnect coupler 17 of the tool head 15 is similarly constructed having a ball valve 61', and a hex nipple 20' coupling the coupler 17 to the tool head 15.

In operation, when the male quick disconnect coupler 17 of the head 15 is inserted into the female quick disconnect coupler 26 of the swivel connector 10, the ball valves of the male and female couplers engage each other so that the balls are displaced from their associated valve seat positions as shown in FIG. 4, thereby opening the ball valves of the male and female couplers. Similarly, when the female quick disconnect coupler 13 of its hose 11 is coupled to the male quick disconnect coupler 24 of the swivel connector 10, the ball valves of these couplers are also opened. Consequently, a continuous hydraulic fluid flow path is established through the hydraulic swivel connector 10. Thus, hydraulic fluid can flow from the female coupler 13 of the hose 11, through the open ball valve 61, the male coupler bores 92 and 84, the hex nipple longitudinal passageway 90, the block bore 16 and passageway 28, the stem passageway 32, the female coupler bore 62 and through the open ball valve 60 to the male coupler 17 of the tool head 15.

To secure the male coupler 17 of the tool head 15 to the female coupler 26, the coupler 26 has a sliding knurled nut 94 which has an annular shoulder 96 which engages an annular shoulder 98 of the female coupler member 50. The threads of the knurled nut 94 engage corresponding threads 21 on the exterior of the male coupler member 19 of the male disconnect coupler 17. Similar threads are indicated at 100 of the male quick disconnect coupler 24 of FIG. 3. The male coupler 24 of the connector 10 is coupled to the female coupler 13 of the hose 11 in a similar manner, as shown in FIG. 4. An O-ring 102 seated within an annular groove of the female coupler member cylindrical bore 52 seals the coupling of the male and female couplers.

As shown in FIG. 1, the female coupler 26, may have a removable threaded cap 120 to protect the coupler 26 when not coupled to a male coupler. The male coupler 24 may have a corresponding plastic snap fit cap 122 to protect the coupler 24 when not used.

The novel design of the stem 12 of the connector 10 allows a female quick disconnect coupler to extend directly from the stem so that the overall length of the connector is minimized. Furthermore, the design allows the female coupler 26 to utilize components from "off-the-shelf" couplers. For example, the female coupler member 50, knurled nut 94, O-ring 102, ball 64 and spring 68 of the female quick disconnect coupler 26 can be obtained from a standard female quick disconnect coupler similar to the female coupler 13 of the hose 11. The coupler 13 is the female half of an Enerpac ⅜ inch high flow coupler (part number C-604) and is shown in greater detail in FIG. 5. As shown therein, the standard Enerpac female coupler 13 has a hex nipple member 110 which has pipe threads at one end 112 and machine threads at the other end 114. The nipple end 114 includes a seat 116 for the spring of the ball valve. Referring now to FIG. 4, a hex adaptor 130 couples the hex nipple 110 of the female coupler 13 to pipe threads 132 extending from the hose 11.

It is seen from the above that a highly compact and portable swivel connector is provided which can be readily coupled to hydraulic devices such as hydraulic hoses and hydraulic tools having corresponding male and female quick disconnect couplers. Thus, for applications requiring a hydraulic tool head to be operated in a constricted area, the connector 10 can be used to provide a swivel connection between the hydraulic tool head and the hydraulic hose to prevent kinking and the possible explosion of the hose when the hydraulic pressure is applied. The compact design of the illustrated embodiment allows such a combination to be used in very narrow areas.

Furthermore, the connector 10 eliminates the need for any adaptor between the stem and the female coupler, thereby reducing the size and weight of the device and reducing operator fatigue. Also, less storage space is required. Still further, the provision of the quick disconnect couplers facilitates set up and prevents leakage upon disconnection. The connector 10 can be easily inserted between the hose and tool head and then removed as conditions warrant. Hoses are easily changed and special storage requirements for the hoses can be eliminated.

It will, of course, be understood that modifications of the present invention, in its various aspects, will be apparent to those skilled in the art, some being apparent only after study and others being many matters of routine hydraulic and mechanical design. For example, the male quick disconnect coupler 24 may be removed and a hydraulic hose or other hydraulic apparatus may be coupled either directly to the block 14 or via another type of plumbing fitting. Alternatively, the ball valves might be eliminated from the quick disconnect couplers. Other embodiments are also possible, with their specific designs dependent upon the particular application. As such, the scope of the invention should not be limited by the particular embodiment herein described, but should be defined only by the appended claims and equivalents thereof.

I claim:

1. A hydraulic swivel connector comprising:

a generally cylindrical unitary, one-piece stem having a first end and a male second end which defines an aperture, said male second end being integral with the stem first end and having threads on the exterior of the male second end;

a block having a generally cylindrical cavity which defines an aperture in the block for receiving the first end of the stem, said block being adapted to sealingly rotate about the stem, said block further having a threaded bore which defines an aperture fluidically coupled to the block cavity;

a spring;

said stem further having a passageway including a shoulder for receiving an end portion of said spring, said passageway fluidically coupling the aperture of the male second end of the stem to the block cavity so that the stem end aperture is fluidically coupled to the block bore apreture;

a generally cylindrical female coupler member having a first generally cylindrical bore adapted to receive a male quick disconnect coupler, said female coupler member further having a second generally cylindrical bore having interior threads adapted to threadably engage the threaded male second end of the stem, and a valve seat defining a passageway fluidically coupling the female coupler member first bore to the second bore; and a movable member positioned in the female coupler member passageway and said spring being seated in the stem passageway, said end portion of said spring abutting said shoulder, and said spring biasing the movable member to sealingly engage the valve seat to close the female coupler member passageway when the male quick disconnect coupler is removed from the female coupler member first bore.

2. The connector of claim 1 further comprising a male quick disconnect coupler having a threaded end to threadably couple to the block threaded bore and a second end for coupling to another female quick disconnect coupler.

3. The connector of claim 1 wherein the female coupler member has an annular shoulder and the connector further comprises a knurled nut having an annular shoulder for engaging the annular shoulder of the female coupler member, said knurled nut for threadably engaging corresponding threads of the male quick disconnect coupler.

4. The connector of claim 1 further comprising an O-ring carried by the stem and adapted to sealingly seat between the female coupler member and the connector stem.

* * * * *